United States Patent
Enders et al.

(10) Patent No.: US 7,896,533 B2
(45) Date of Patent: Mar. 1, 2011

(54) MOTOR VEHICLE HEADLIGHT

(75) Inventors: Martin Enders, Deisenhofen (DE);
Helmut Erdl, Vogtareuth (DE); Joachim Ripperger, Unterfoehring (DE); Patrick Kuhl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/424,002

(22) Filed: Apr. 15, 2009

(65) Prior Publication Data
US 2009/0251881 A1    Oct. 8, 2009

Related U.S. Application Data

(63) Continuation of application No. PCT/EP2007/008640, filed on Oct. 5, 2007.

(30) Foreign Application Priority Data
Oct. 19, 2006 (DE) .................. 10 2006 049 302

(51) Int. Cl.
*B60Q 1/06* (2006.01)
(52) U.S. Cl. .................. 362/525; 362/43; 362/465; 362/523; 362/543
(58) Field of Classification Search ............ 362/43–52, 362/464–469, 523–537, 543–545, 285–289, 362/418–430
See application file for complete search history.

(56) References Cited

U.S. PATENT DOCUMENTS

| | | | | |
|---|---|---|---|---|
| 5,499,168 A * | 3/1996 | Cochard et al. | ............. | 362/466 |
| 5,633,710 A * | 5/1997 | Kumra et al. | ............. | 362/465 |
| 6,736,524 B2 * | 5/2004 | Albou | .................. | 362/228 |
| 6,776,513 B2 * | 8/2004 | Albou | .................. | 362/507 |
| 6,874,918 B2 * | 4/2005 | Tawa et al. | ............. | 362/465 |
| 2002/0196634 A1 | 12/2002 | Jeannot | | |
| 2003/0122704 A1 | 7/2003 | Dubrovin | | |
| 2005/0275562 A1 | 12/2005 | Watanabe | | |
| 2006/0109672 A1 | 5/2006 | Sasaki et al. | | |
| 2009/0015388 A1 * | 1/2009 | Yagi et al. | ............. | 340/435 |

FOREIGN PATENT DOCUMENTS

| | | |
|---|---|---|
| DE | 43 41 409 A1 | 6/1995 |
| DE | 103 47 951 A1 | 5/2005 |
| DE | 10 2005 026 684 A1 | 1/2006 |
| DE | 602 07 602 T2 | 8/2006 |

(Continued)

OTHER PUBLICATIONS

International Search Report dated Dec. 17, 2007 w/English translation (six (6) pages).

(Continued)

*Primary Examiner*—Bao Q Truong
(74) *Attorney, Agent, or Firm*—Crowell & Moring LLP

(57) ABSTRACT

A motor vehicle headlight is provided having a basic light source, a swiveling device which is equipped for swiveling the basic light source about a basic swiveling angle, and an infrared radiation source which is coupled with the swiveling device such that, when the basic light source is swiveled by the swiveling device about a basic swiveling angle, the infrared radiation source is swiveled by the swiveling device about an infrared swiveling angle deviating from the basic swiveling angle.

20 Claims, 2 Drawing Sheets

FOREIGN PATENT DOCUMENTS

| | | |
|---|---|---|
| EP | 1 323 570 A1 | 7/2003 |
| EP | 1 378 396 A2 | 1/2004 |
| EP | 1 666 304 A2 | 6/2006 |
| JP | 2004-63166 A | 2/2004 |
| JP | 2005-59662 A | 3/2005 |

OTHER PUBLICATIONS

German Search Report dated Jan. 18, 2008 w/English translation of pertinent portions (nine (9) pages).

* cited by examiner

MOTOR VEHICLE HEADLIGHT

CROSS-REFERENCE TO RELATED APPLICATIONS

This application is a continuation of PCT International Application No. PCT/EP2007/008640, filed Oct. 5, 2007, which claims priority under 35 U.S.C. §119 to German Patent Application No. 10 2006 049 302.8, filed Oct. 19, 2006, the entire disclosures of which are herein expressly incorporated by reference.

BACKGROUND AND SUMMARY OF THE INVENTION

The invention relates to a motor vehicle headlight having a basic light source and an infrared radiation source.

In recent years, the rapid technological development in the field of motor vehicle illumination engineering has led to the integration of an increasing number of functionalities in a motor vehicle headlight.

Thus, motor vehicle headlights are known which emit infrared radiation in order to utilize the latter within the scope of a camera-based driver assistance system in darkness, particularly for an active night vision system. In this case, infrared radiation reflected by objects or passerbys is detected by a sensor device, is converted to images of the objects or passersby, and then are displayed on a display device.

In addition, motor vehicle headlights are known which have a swivelable or partially swivelable construction for an adaptation to a winding road or within the scope of a headlight range adjustment. For this purpose, the motor vehicle headlights have one or two motors, by which the optical headlight axis can be adjusted in order to implement a cornering light function and/or a headlight range adjustment.

The ray distribution of the infrared radiation normally has a region of high radiation intensities in the center of the ray distribution and a region of low radiation intensities at the edge of the ray distribution. The region of medium radiation intensities is situated in-between. The ray distribution of the infrared radiation source is largely rigid. This means that it can normally be moved neither in the vertical direction (headlight range adjustment), nor in the horizontal direction (cornering light function).

The characteristic of the ray distribution as well as its immobility mean that a night vision system will have a high range only when the vehicle is situated on a straight road and in its basic manufactured position (i.e., no pitch angle as a result of loading or the like).

In horizontal curves, on summits or in troughs, as well as when the pitch angle of the vehicle body has changed (for example, during braking or accelerating maneuvers or during loading), the range of the night vision system will decrease because the center of the ray distribution is no longer oriented toward the relevant region of the road. Although these disadvantageous effects can be reduced by a ray distribution whose region of high radiation intensities is spread out vertically as well as horizontally, such a ray distribution requires a high radiation power of the infrared radiation source. The latter, in turn, requires high electric power and causes considerable thermal dissipation which, particularly in the case of semiconductor radiation sources, has to be removed by high-expenditure cooling measures.

It is now an object of the invention to provide a motor vehicle headlight which can be used in a flexible and economical manner.

According to the invention, a motor vehicle headlight is equipped with a basic light source and an infrared radiation source, the basic light source being constructed to be swivelable about a basic swiveling angle, and the infrared radiation source being constructed to be swivelable about an infrared swiveling angle that differs from the basic swiveling angle. As a result, it is achieved that, as a function of the driving situation, the basic light source can be swiveled about a basic swiveling angle taking into account the radiation characteristic of the basic light source, and as a function of the driving situation, the infrared radiation source can be swiveled about an infrared swiveling angle taking into account the radiation characteristic of the infrared radiation source.

The infrared radiation source and/or the basic light source may in this case each include a reflector and/or a casing. A swiveling angle describes, for example, the deviation of the main radiation direction or of the center of gravity radiation direction of the infrared radiation source or of the basic light source from the longitudinal vehicle axis.

The motor vehicle headlight preferably includes a basic light source and a swiveling device, which is equipped for the horizontal and/or vertical swiveling of the basic light source about a basic swiveling angle. An infrared radiation source is coupled with the swiveling device in such a manner that, when the basic light source is swiveled by use of the swiveling device about a basic swiveling angle, the infrared radiation source is swiveled horizontally and/or vertically by way of the swiveling device about an infrared swiveling angle deviating from the basic swiveling angle. Of course, the invention also includes the case wherein the basic light source is coupled with the swiveling device of an infrared radiation source such that, when the infrared radiation source is swiveled by use of the swiveling device about an infrared swiveling angle, the basic light source is swiveled horizontally and/or vertically by way of the swiveling device about a basic swiveling angle deviating from the infrared swiveling angle.

As a result, it is achieved that, by using only one swiveling device, automatically the radiation direction of the basic light source as well as the radiation direction of the infrared radiation source can be changed, specifically, differently corresponding to the different target regions, and, in each case, while taking into account the different radiation characteristics of the basic light source and of the infrared radiation source. In addition, such a motor vehicle headlight requires little space.

The coupling of the swiveling device to the infrared radiation source or the basic light source preferably has a mechanical construction and is based, particularly, on an angle conversion device or an angle translation device which converts the basic swiveling angle to an infrared swiveling angle or vice-versa. For this purpose, the angle conversion device preferably has a suitable gear, transmission, chain and/or rod mechanism.

The motor vehicle headlight preferably includes only one motor, and/or the swiveling device is coupled with only one motor such that, by use of only one motor, two different swiveling angles (basic swiveling angle and infrared swiveling angle) can be set.

Particularly preferably, one motor acts upon the swiveling device for swiveling the basic light source, particularly upon a swivelable carrier device for carrying the basic light source, and the motor or the swiveling device for swiveling the basic light source acts upon the angle conversion device which, in turn, acts upon a swiveling device for swiveling the infrared radiation source, particularly upon a swivelable carrier device for carrying the infrared radiation source.

As an alternative thereto, a motor acts upon the swiveling device for swiveling the infrared radiation source, particularly upon a swivelable carrier device for carrying the infrared radiation source, and the motor or the swiveling device for swiveling the infrared radiation source acts upon the angle conversion device which, in turn, acts upon a swiveling device for swiveling the basic light source, particularly upon a swivelable carrier device for carrying the basic light source.

Depending on the embodiment, the swiveling device may include one or more of the following components: a motor, a carrier device of the basic light source, a carrier device of the infrared radiation source, and/or an angle conversion device.

The swiveling device is preferably coupled with the basic light source and the infrared radiation source such that the horizontal and/or vertical infrared swiveling angle $\alpha IR$ and/or $\beta IR$ correlates with the horizontal and/or vertical basic swiveling angle $\alpha ABL,FL$ and/or $\beta ABL,FL$, or that the horizontal and/or vertical infrared swiveling angle $\alpha IR$ and/or $\beta IR$ depends on the horizontal and/or vertical basic swiveling angle $\alpha ABL,FL$ and/or $\beta ABL,FL$:

$$\alpha IR = f(\alpha ABL,FL, \beta ABL,FL);$$

$$\beta IR = f(\alpha ABL,FL, \beta ABL,FL).$$

It is preferable in this case for a linear connection to exist between the horizontal basic swiveling angle $\alpha ABL,FL$ and the horizontal infrared swiveling angle $\alpha IR$:

$$\alpha IR = n^* \alpha ABL,FL.$$

Preferably, this connection applies only in a given value range of the horizontal basic swiveling angle $\alpha ABL,FL$.

The proportionality factor "n" that is used may vary in this case depending on the value of the horizontal basic swiveling angle $\alpha ABL,FL$. In given value ranges of the horizontal basic swiveling angle $\alpha ABL,FL$, the proportionality factor preferably is n=1.

Particularly preferably, the horizontal infrared swiveling angle $\alpha IR$ is equal to a fixed maximal limit angle if the horizontal basic swiveling angle $\alpha ABL,FL$ exceeds a given limit value.

In the case of the basic light source as a low-beam headlight, it is assumed, for example, that objects are recognized at distances of approximately 60 m from the vehicle. The swiveling angle of the basic light source is therefore set such that the center of the light distribution of the basic light source is situated at a distance of approximately 60 m in a curve on the center of one's own lane.

By means of the infrared radiation source as a component of a night vision system, objects are to be recognized at longer distances of up to approximately 150 m. The infrared swiveling angle of the infrared radiation source in curves is therefore preferably set to a higher value than the basic swiveling angle of the basic light source so that, at this distance, the center of the infrared radiation distribution is, in all probability, situated on the center of the vehicle's own lane.

When a foresighted sensor system is used which, for example, based on an image sensor or a navigation system, detects the course of the lane situated in front of the vehicle, n is preferably set to greater than 1, particularly equal to 2, for the determination of the swiveling angles, at least in a limited value range of the horizontal basic swiveling angle $\alpha ABL,FL$.

When a non-foresighted sensor system is used, which is based, for example, on the evaluation of the vehicle dynamics (yaw rate, steering angle, speed), preferably n is set to be lower than 1 for the determination of the swiveling angle, at least in a limited value range of the horizontal basic swiveling angle $\alpha ABL,FL$. Then, the infrared radiation source is not swiveled so intensively, since otherwise, without any foresightedness, an excessive fault would arise during cornering changes. In this case, n is preferably ½ or ⅓.

When a camera having a rigid horizontal range of coverage of $-X$ degrees to $+X$ degrees is used within the scope of the night vision system, the horizontal infrared swiveling angle $\alpha IR$ is preferably limited to maximally $-X/2$ degrees or $+X/2$ degrees. The reason is that in this case it does not result in any advantage to swivel the IR radiation distribution farther than to half of the coverage range boundaries.

As a result, it is achieved that the infrared radiation distribution is not always swiveled to the same extent as the low-beam or high-beam distribution, or is not always swiveled as a function of the low-beam or high-beam distribution. Particularly in tight curves, it can thereby be avoided that the intensive horizontal swiveling angle of the basic light source has the result that the center of the infrared radiation distribution is oriented outside the coverage range of the infrared camera of a high vision system.

The vertical infrared swiveling angle preferably corresponds to the vertical basic swiveling angle. However, here also, the vertical infrared swiveling angle should preferably maximally correspond to half the coverage range, thus, be limited to $-X/2$ degrees or $+X/2$ degrees, when the vertical coverage range of the camera is rigidly between $-X$ degrees and $+X$ degrees.

As a result of the invention, it is particularly achieved that, by use of the infrared radiation source, in all probability, the region situated in front of the vehicle is illuminated which is important to the driver in the current driving situation and which is possibly covered by the camera of the night vision system.

Preferably, the basic light source and/or the infrared radiation source can be automatically swiveled in the horizontal direction at least in certain operating modes or driving situations as a function of the position of the steering wheel, of the front wheels, and/or of the yaw rate, particularly within the scope of an automatic cornering light system.

Advantageously, the basic light source and/or the infrared radiation source can, additionally or alternatively thereto, be automatically swiveled in the vertical direction at least in certain operating modes or driving situations as a function of the pitch angle of the motor vehicle, particularly within the scope of a headlight range adjustment.

As a result, for example, the basic light source can be adapted by corresponding swiveling operations of the carrier device within the scope of an adaptive cornering light system to the route to be traveled and within the scope of a headlight range adjustment to the pitch angle of the vehicle. Without any additional control expenditures and without an additional motor, an infrared radiation source can, in this case, be adapted automatically by a corresponding swiveling to the route to be traveled and to the pitching angle of the vehicle.

According to an advantageous further development of the invention, the infrared radiation source is further developed to be semiconductor-based, particularly LED (light-emitting diode)-based or laser-based, and is prepared such that it radiates light preferably in the infrared wavelength spectrum.

The basic light source, by which especially a high-beam and/or low-beam headlight is implemented, is preferably constructed as a halogen lamp, as a gas discharge lamp (for example, a xenon lamp) or as a semiconductor-based construction, and is prepared such that it preferably radiates light in the visible wavelength spectrum. Particularly preferably, the basic light source is constructed as a bi-xenon light source.

On the whole, a flexible motor vehicle headlight is created in this manner, which can be used adaptively when the night vision system is activated and deactivated and, particularly by the integration of two different light sources in a motor vehicle headlight module, can be produced economically and can be installed into a vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
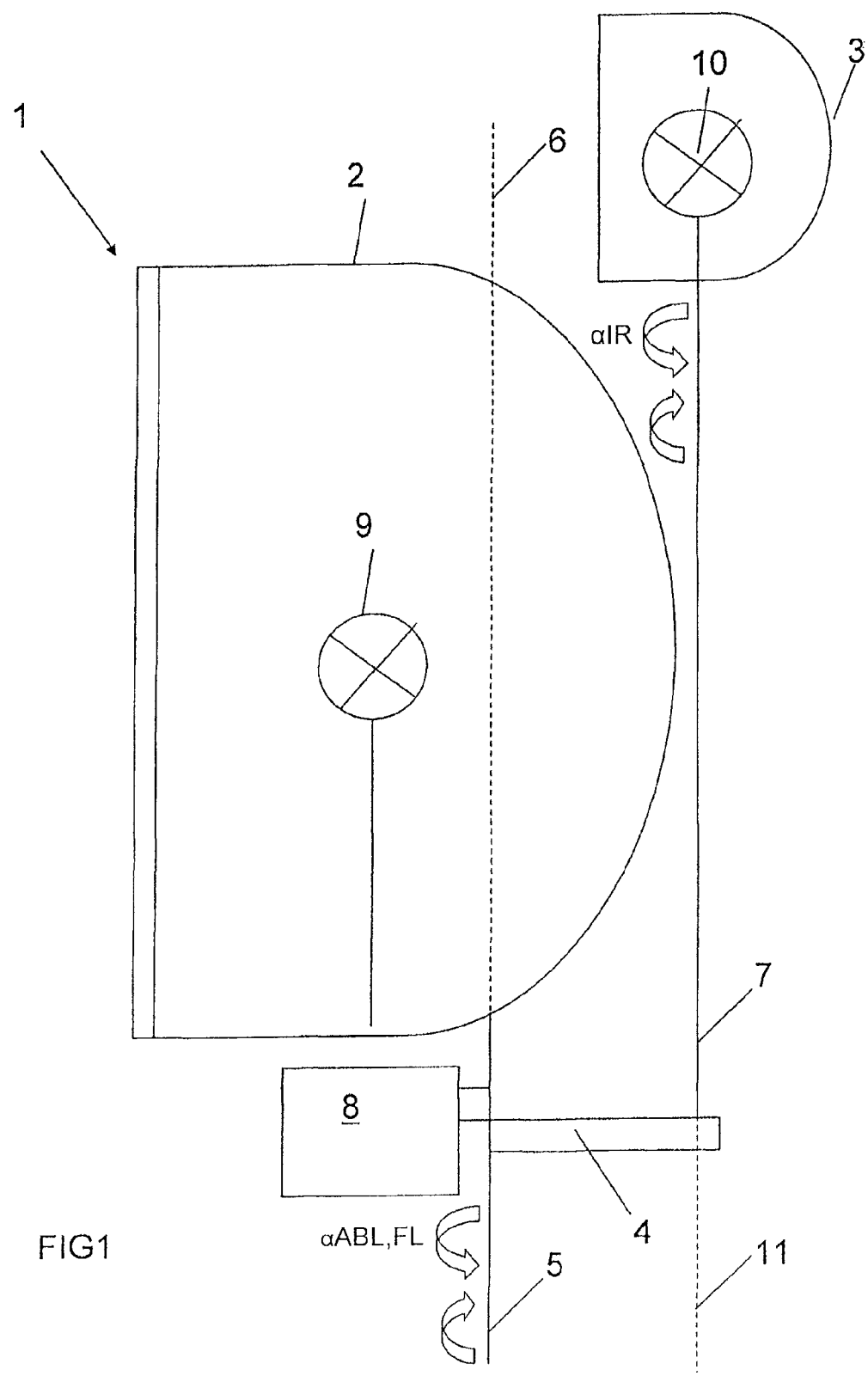
FIG. 1 is a sectional view of a motor vehicle headlight according to an embodiment of the invention.

FIG. 1 illustrates a motor vehicle headlight 1, which comprises a basic light source 2 together with a gas discharge lamp 9, a casing and a reflector, as well as an infrared radiation source 3 together with several infrared-emitting diodes (IRED) 10, a casing and a reflector.

The basic light source 2 is carried by a carrier device 5, and the infrared radiation source 3 is carried by a carrier device 7.

Within the scope of an automatic cornering light system, the carrier device 5 of the basic light source 2 can be swiveled about the axis 6, and, within the scope of an automatic cornering light system, the carrier device 7 of the infrared radiation source 3 can be swiveled about the axis 11.

An electric motor 8, controlled by a control device of the cornering light system, acts upon the carrier device 5 of the basic light source 2 such that, as a function of the driving situation, the latter is automatically swiveled about a basic swiveling angle $\alpha ABL,FL$. By way of an angle conversion device 4, the carrier device 5 of the basic light source 2 acts upon the carrier device 7 of the infrared radiation source 3, such that the latter is automatically swiveled about an infrared swiveling angle $\alpha IR$.

In this case, for example, $\alpha IR = n^* \alpha ABL,FL$ applies.

When a rigid camera having a coverage range of $-X$ to $X$ is used, the following relationship is advantageously selected between $\alpha IR$ and $\alpha ABL,FL$:

$$\alpha IR = n^* \alpha ABL,FL, \text{ if } -X/2 < \alpha ABL,FL < X/2$$

$$\alpha IR = -X/2, \text{ if } \alpha ABL,FL < -X/2$$

$$\alpha IR = X/2, \text{ if } \alpha ABL,FL > X/2$$

When a swivelable camera having a coverage range of $-X$ to $X$ and a swiveling range of $-Y$ to $Y$ is used, the following relationship is advantageously selected between $\alpha IR$ and $\alpha ABL,FL$:

$$\alpha IR = n^* \alpha ABL,FL, \text{ if } -X/2-Y < \alpha ABL,FL < X/2+Y$$

$$\alpha IR = -X/2-Y, \text{ if } \alpha ABL,FL < -X/2-Y$$

$$\alpha IR = X/2+Y, \text{ if } \alpha ABL,FL > X/2+Y;$$

wherein, when a foresighted sensor system (for example, camera sensors, navigation data, etc.) is used, the following is to apply:

$$n >= 1 \text{ (for example, } n=2);$$

and wherein, when a not foresighted sensor system (for example, evaluation of vehicle dynamics) is used, the following is to apply:

$$n <= 1 \text{ (for example, } n=\frac{1}{2} \text{ or } n=\frac{1}{3}).$$

Analogous to the swiveling of light sources in the horizontal direction, an embodiment, in addition or as an alternative, provides a swiveling in the vertical direction about axes disposed perpendicularly to the plane of the sheet, for example, within the scope of an automatic headlight range adjustment.

Figure 2:
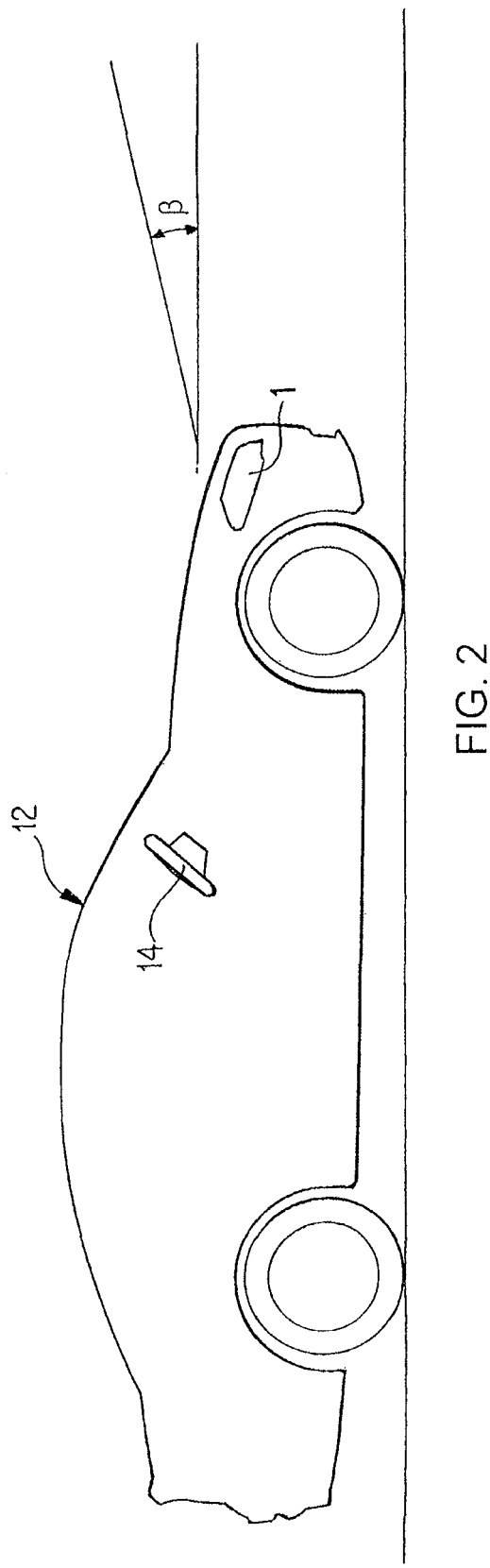
FIG. 2 is a schematic diagram of a motor vehicle including a motor vehicle headlight according to an embodiment of the invention.

FIG. 2 illustrates a motor vehicle 12, which includes a motor vehicle headlight 1 and a steering wheel 14. The motor vehicle 12 may have a pitch angle $\beta$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle headlight for a motor vehicle, the motor vehicle headlight comprising:
    a basic light source;
    a swiveling device operatively configured for swiveling the basic light source about a first axis by a basic swiveling angle; and
    an infrared radiation source operatively coupled with the swiveling device such that, when the basic light source is swiveled via the swiveling device about the basic swiveling angle, the infrared radiation source is swiveled via the swiveling device about a second axis by an infrared swiveling angle which differs from the basic swiveling angle,
    wherein the first axis is substantially parallel to the second axis.

2. The motor vehicle headlight according to claim 1, further comprising:
    at least one carrier device swivelable by the swiveling device, said carrier device carrying at least one of the basic light source and the infrared radiation source.

3. The motor vehicle headlight according to claim 1, wherein the infrared swiveling angle is a function of the basic swiveling angle.

4. The motor vehicle headlight according to claim 2, wherein the infrared swiveling angle is a function of the basic swiveling angle.

5. The motor vehicle headlight according to claim 1, further comprising:
    an angle conversion device operatively configured to convert the basic swiveling angle to the infrared swiveling angle.

6. The motor vehicle headlight according to claim 2, further comprising:
    an angle conversion device operatively configured to convert the basic swiveling angle to the infrared swiveling angle.

7. The motor vehicle headlight according to claim 3, further comprising:
    an angle conversion device operatively configured to convert the basic swiveling angle to the infrared swiveling angle.

8. The motor vehicle headlight according to claim 1, wherein at least one of the basic light source and the infrared radiation source are automatically swivelable as a function of a position of a steering wheel of the motor vehicle.

9. The motor vehicle headlight according to claim 3, wherein at least one of the basic light source and the infrared radiation source are automatically swivelable as a function of a position of a steering wheel of the motor vehicle.

10. The motor vehicle headlight according to claim 5, wherein at least one of the basic light source and the infrared radiation source are automatically swivelable as a function of a position of a steering wheel of the motor vehicle.

11. The motor vehicle headlight according to claim 1, wherein at least one of the basic light source and the infrared radiation source are automatically swivelable as a function of a pitch angle of the motor vehicle.

12. The motor vehicle headlight according to claim 3, wherein at least one of the basic light source and the infrared radiation source are automatically swivelable as a function of a pitch angle of the motor vehicle.

13. The motor vehicle headlight according to claim 5, wherein at least one of the basic light source and the infrared radiation source are automatically swivelable as a function of a pitch angle of the motor vehicle.

14. The motor vehicle headlight according to claim 8, wherein at least one of the basic light source and the infrared radiation source are automatically swivelable as a function of a pitch angle of the motor vehicle.

15. A method of operating a motor vehicle headlight for a motor vehicle, the motor vehicle headlight having a basic light source and an infrared radiation source, the method comprising the acts of:
    swiveling the basic light source about a first axis by a basic swiveling angle via a swiveling device; and
    simultaneously swiveling the infrared radiation source about a second axis by an infrared swiveling angle via the swiveling device, wherein the infrared swiveling angle is different from the basic swiveling angle,
    wherein the first axis is substantially parallel to the second axis.

16. The method according to claim 15, further comprising the acts of:
    determining a position of a steering wheel of the motor vehicle; and
    automatically swiveling the basic light source and the infrared radiation source as a function of the position of the steering wheel.

17. The method according to claim 15, further comprising the acts of:
    determining a pitch angle of the motor vehicle; and
    automatically swiveling the basic light source and the infrared radiation source as a function of the pitch angle of the motor vehicle.

18. A motor vehicle headlight for a motor vehicle, the motor vehicle headlight comprising:
    a basic light source;
    a swiveling device operatively configured for swiveling the basic light source about a basic swiveling angle with respect to an axis that is substantially perpendicular to a main radiation direction of the basic light source; and
    an infrared radiation source operatively coupled with the swiveling device such that, when the basic light source is swiveled via the swiveling device about the basic swiveling angle, the infrared radiation source is swiveled via the swiveling device about an infrared swiveling angle with respect to an axis that is substantially perpendicular to a main radiation direction of the infrared light source,
    wherein the infrared swiveling angle differs from the basic swiveling angle.

19. The motor vehicle headlight according to claim 18, wherein the infrared swiveling angle is a function of the basic swiveling angle.

20. The motor vehicle headlight according to claim 18, further comprising:
    an angle conversion device operatively configured to convert the basic swiveling angle to the infrared swiveling angle.

* * * * *